(12) United States Patent
Barber

(10) Patent No.: US 9,540,116 B1
(45) Date of Patent: Jan. 10, 2017

(54) ATTITUDE INDICATOR GENERATING AND PRESENTING SYSTEM, DEVICE, AND METHOD

(71) Applicant: Rockwell Collins, Inc., Cedar Rapids, IA (US)

(72) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 7 days.

(21) Appl. No.: 14/754,779

(22) Filed: Jun. 30, 2015

(51) Int. Cl.
*B64D 45/00* (2006.01)
*B64D 43/00* (2006.01)
*G01C 23/00* (2006.01)

(52) U.S. Cl.
CPC .............. *B64D 43/00* (2013.01); *G01C 23/00* (2013.01)

(58) Field of Classification Search
CPC ....... G01C 23/005; G01C 23/00; G01C 21/00; G01C 19/32; G08G 5/0021; G08G 5/025; B64D 2700/6221; B64D 43/00; B64D 45/00
USPC .... 701/3, 4, 8, 16, 9, 14, 400; 340/973–975, 340/977
See application file for complete search history.

(56) References Cited

U.S. PATENT DOCUMENTS

| 6,173,220 B1* | 1/2001 | Schmitt | G01C 23/00 340/945 |
| 6,700,482 B2* | 3/2004 | Ververs | G01C 23/00 340/500 |
| 7,724,155 B1* | 5/2010 | Anderson | G01C 23/00 340/945 |
| 2007/0085705 A1* | 4/2007 | He | G01C 23/00 340/967 |

* cited by examiner

*Primary Examiner* — Dalena Tran
(74) *Attorney, Agent, or Firm* — Daniel M. Barbieri; Donna P. Suchy; Angel N. Gerdzhikov

(57) ABSTRACT

A system, device, and method for generating and presenting an aircraft attitude indicator are disclosed. The attitude indicator presenting system may include a presentation system comprised of one or more display units receiving image data from an image generator (IG). The IG may be configured to acquire navigation data and generate the image data as a function of the navigation data. The navigation data could include data representative of aircraft roll and/or pitch attitude, and the image data could be representative of at least of an image of the attitude indicator comprised of a sky area and a ground area. The ground area may be visually presented by either a first texture or a second texture depending on whether a trigger attitude has been met or exceeded.

20 Claims, 7 Drawing Sheets

Straight-and-level Flight

Level, Right Turn - 45 degrees

ATTITUDE INDICATOR GENERATING AND PRESENTING SYSTEM, DEVICE, AND METHOD

BACKGROUND

Description of the Related Art

The air transportation system of today is extremely safe. However, accidents are still occurring in some cases, with one cause being loss of attitude awareness.

Several air transport accidents have occurred where crew distraction has led to the aircraft entering an excessive or unusual attitude from which it is not recovered. In these accidents, the flight crew fails to recognize that the aircraft is entering an unusual attitude, and often responds initially with control inputs in the wrong direction. This typically happens in a roll, where an initial control input aimed at righting the aircraft actually takes the aircraft further into the excessive roll condition, leading to loss of lift and rapid pitch down motion.

When the flight crew becomes distracted and the aircraft is not being maintained in pitch and roll by the autopilot, the aircraft may begin to change attitude imperceptibly. This typically happens in roll due to static and dynamic stability around the longitudinal axis. When the crew realizes that the aircraft has departed from straight and level flight, the pilot flying has to immediately interpret the available information and initiate a corrective action.

In the absence of any external visual cues such as flying in Instrument Meteorological Conditions, the cues and symbology provided by a classic electronic attitude indicators may be misinterpreted. Pilots may interpret (perhaps subconsciously) a roll pointer found in the attitude indicator as indicating a roll to the right when the aircraft is actually in a left turn. This may lead to an incorrect control input, exacerbating the condition and potentially leading to loss of control in some cases.

SUMMARY

Embodiments of the inventive concepts disclosed herein are directed to a system, device, and method for generating and presenting an aircraft attitude indicator to enhance a pilot's situational awareness of an unusual attitude. The attitude indicator may draw the pilot's attention to the presence of or an encounter with an unusual attitude.

In one aspect, embodiments of the inventive concepts disclosed herein are directed to a system for presenting an attitude indicator. The system may include a presentation system comprised of one or more display units. The presentation system could be configured to receive image data from an image generator (IG) configured (or programmed) to perform a method of generating an attitude indicator presentable to a viewer.

In a further aspect, embodiments of the inventive concepts disclosed herein are directed to a device for generating an attitude indicator. The device may include the IG and may be configured to perform a method of generating an attitude indicator presentable to a viewer.

In a further aspect, embodiments of the inventive concepts disclosed herein are directed to a method for generating an attitude indicator. When properly configured, the IG may acquire navigation data representative of aircraft roll and/or pitch attitude and generate image data based upon one or both of them. The image data could be representative of an image of the attitude indicator comprised of a sky area and a ground area, where the ground area visually presents a first texture when both roll and/or pitch attitude are less than or equal to a trigger attitude or a second texture when either is greater than or equal to the trigger attitude.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
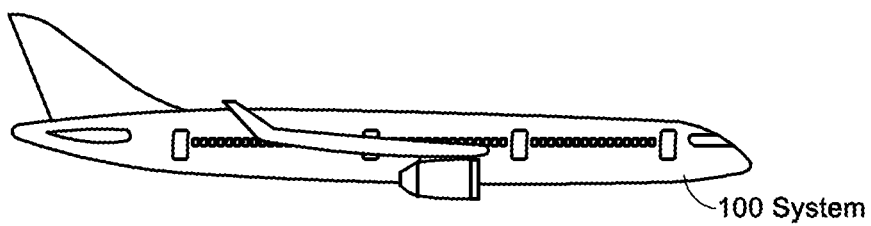
FIG. 1A depicts an aircraft configured with an attitude indicator generation and presentation system according to the inventive concepts disclosed herein.
Figure 1B:
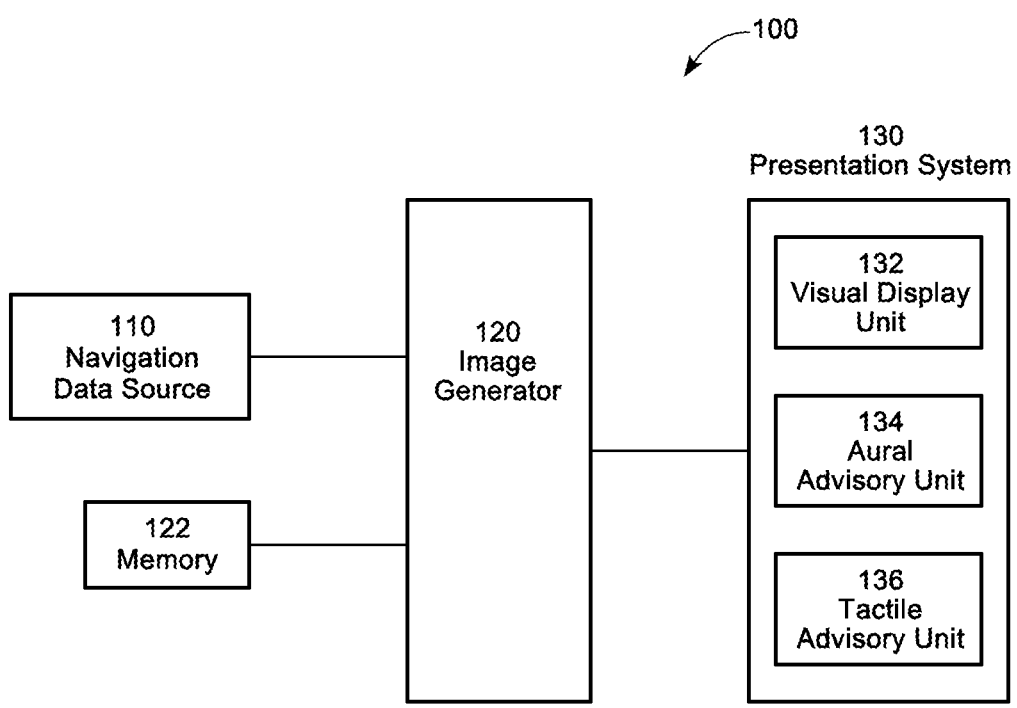
FIG. 1B depicts a functional block diagram of the generation and presentation system of FIG. 1A.

FIG. 1A depicts an aircraft configured with attitude indicator generating system 100 suitable for implementation of the techniques described herein. FIG. 1B depicts a functional block diagram of the aircraft attitude indicator generating system 100 suitable for implementation of the techniques described herein. The functional blocks of the system 100 include a navigation data source 110, an image generator (IG) 120, and a presentation system 130.

The navigation data source 110 could include any source(s) which provides navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, attitude, ground speed, air speed, and/or time. Aircraft position may be comprised of geographic position (e.g., latitude and longitude coordinates) and altitude, and ground track may be derived from either geographic position, aircraft position, or both. Aircraft orientation may be comprised of pitch, roll, and/or yaw information related to the attitude of the aircraft.

It should be noted that, in some embodiments for any source or system in an aircraft including the navigation data source 110, data could be comprised of any analog or digital signal, either discrete or continuous, which could contain information or be indicative of information. In some embodiments, aircraft could mean any vehicle which is able to fly through the air or atmosphere including, but not limited to, lighter than air vehicles and heavier than air vehicles, wherein the latter may include manned or unmanned fixed-wing and rotary-wing vehicles.

The IG 120 could include any electronic data processing unit which executes software or computer instruction code that could be stored, permanently or temporarily, in a digital memory storage device or a non-transitory computer-readable media (generally, memory 122) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The IG 120 may be driven by the execution of software or computer instruction code containing algorithms developed for the specific functions embodied herein. The IG 120 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IG 120 could also consist of more than one electronic data processing unit. In some embodiments, the IG 120 could be a processor(s) used by or in conjunction with any other system of the aircraft including, but not limited to, the navigation data source 110 and the presentation system 130.

In some embodiments, the terms "programmed" and "configured" are synonymous. The IG 120 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a data bus, through a wireless network, or as a signal received and/or transmitted by the IG 120 via a physical or a virtual computer port. The IG 120 may be programmed or configured to execute the method discussed in detail below. The IG 120 may be programmed or configured to provide output data to various systems and/or units including, but not limited to, the presentation system 130.

The presentation system 130 could be comprised of any unit of which visual, aural, and/or tactile indications may be presented to the pilot including, but not limited to, a visual display unit(s) 132, an aural advisory unit 134, and/or a tactile advisory unit 136. The visual display unit 132 could be comprised of any unit of which information may be visually presentable to the pilot. The visual display unit 132 could be part of an Electronic Flight Information System (EFIS) and could include, but is not limited to, a Primary Flight Display (PFD), Head-Down Display (HDD), Electronic Flight Bags, and Portable Electronic Devices (e.g., laptops, smartphones, tablets, and/or user-wearable devices such as head mounted devices).

Figure 2A:
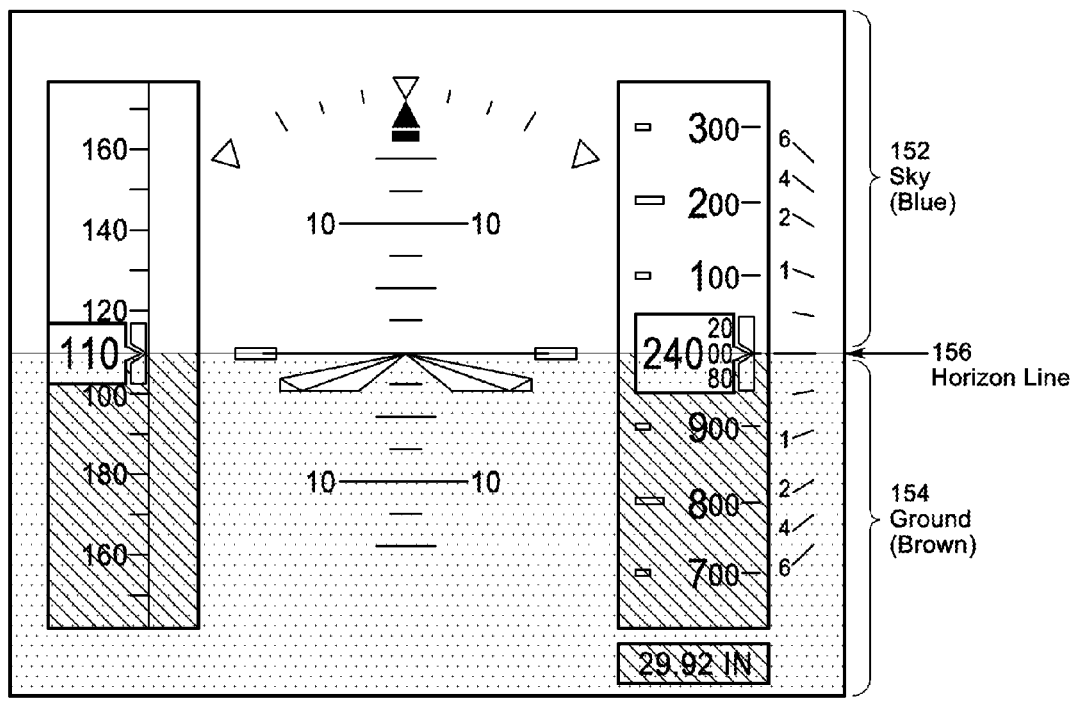
FIG. 2A depicts an exemplary illustration of a classic electronic attitude indicator in straight-and-level flight.
Figure 2B:
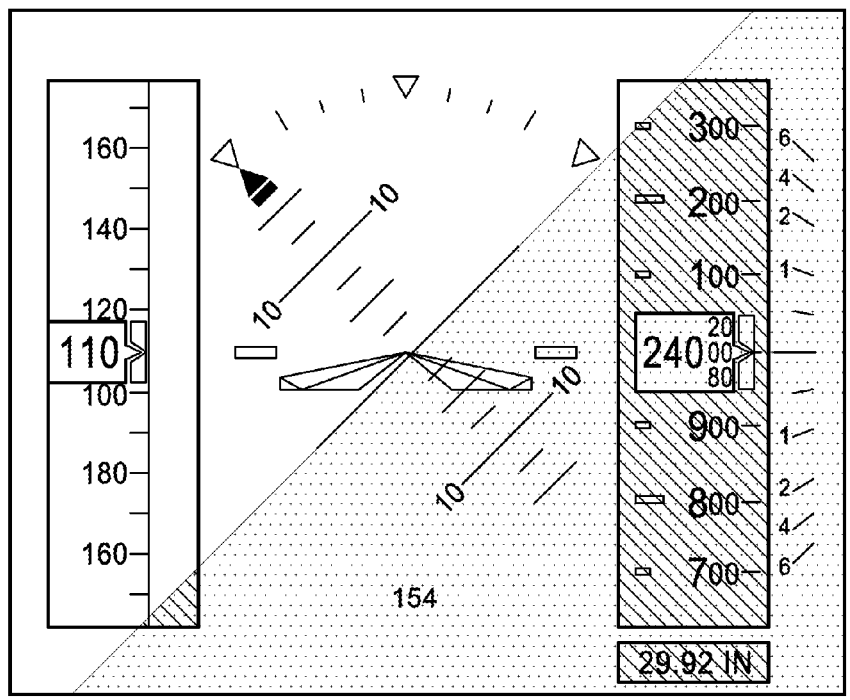
FIG. 2B depicts an exemplary illustration of a classic electronic attitude indicator in a level, right turn.

Referring now to FIG. 2A, an image of a classic electronic attitude indicator is illustrated, where the visual display unit 132 may be configured to present the image. The attitude indicator includes a sky 152 typically colored blue, a ground 154 typically colored brown, and a horizon line 156 dividing the two. As observed, the ground 154 is smooth without the appearance of a texturing effect; in the absence of a texturing effect, the ground 154 appears visually as a smooth texture. As observed, the attitude indicator indicates an aircraft flying in straight-and-level flight. Referring now to FIG. 2B, the same attitude indicator now indicates an aircraft flying in level flight but in a forty-five degrees turn to the right.

The visual display unit 132 may also be configured to present alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. In some embodiments, both caution and warning alerts may be presented in combination with or simultaneous to aural advisories and/or tactile advisories. Non-alerts may be any other information not requiring immediate crew attention or awareness. Alerts may be presented visually by depicting one or more colors and may be presented on a display unit indicating one or more levels of threat. For the purpose of illustration and not limitation, amber or yellow may indicate a caution alert, red may indicate a warning alert, and green or cyan may indicate a non-alert.

Returning back to FIG. 1B, the aural advisory unit 134 may be any unit capable of producing aural advisories. Aural advisories may be discrete sounds, tones, and/or verbal statements used to annunciate a condition, situation, or event. An example of an aural alert includes a verbal statement "UNUSUAL ATTITUDE" which may be generated and presented when a trigger attitude has been reached or exceeded as discussed below. In some embodiments, aural advisories could be presented in combination with or simultaneous to visual alerts and/or tactile advisories.

The tactile advisory unit 136 may be any unit capable of producing tactile advisories. Tactile advisories may be any tactile stimulus to present a condition, situation, or event to the pilot such as, but not limited to, a warning alert and/or a caution alert. Examples of tactile stimuli include a "stick shaker" and a vibrating seat (e.g., a pilot's seat outfitted with a vibrating device). Moreover, tactile advisories could be presented in combination with or simultaneous to visual alerts and/or aural advisories. In some embodiments, one or more units of the presentation system 130 may receive presentation data provided by IG 120.

Some advantages and benefits of embodiments discussed herein are shown in FIGS. 3A through 4D illustrating how the attitude indicator of FIGS. 2A and 2B may be configured to indicate a plurality of unusual attitude(s) that could be encountered during flight. As observed in FIGS. 3A through 4D, the symbologies shown in FIGS. 2A and 2B have been intentionally omitted for the sake of clarity and discussion and not of limitation. For FIGS. 3A through 4D, it will be assumed that a manufacturer and/or end-user has configured a roll trigger attitude as being a turn to the right or to the left greater than or equal to forty-five degrees and a pitch trigger attitude as being a pitch up or pitch down greater than or equal to thirty or twenty degrees, respectively.

Figure 3A:
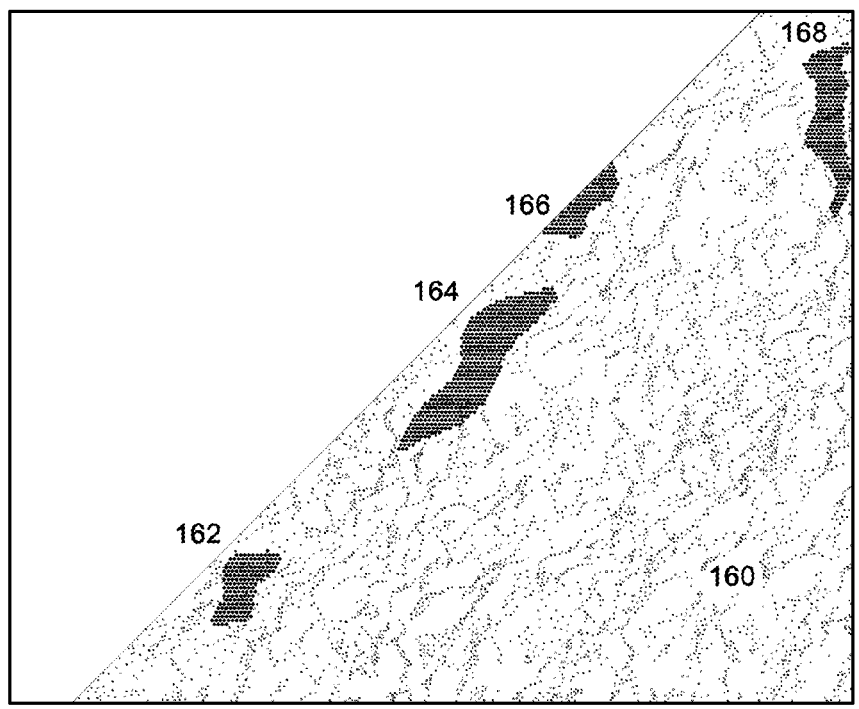
FIG. 3A depicts an exemplary illustration of a classic electronic attitude indicator in which rough texture replaces a smooth texture during a right turn.

Referring now to FIG. 3A, the visually-appearing smooth texture of the ground 154 of the attitude indicator shown in FIGS. 2A and 2B has been replaced by a visually-appearing generic or hypothetical rough texture 160 to which spots 162, 164, 166, and 168 have been added to illustrate the movement of the rough texture 160 during a turn. Here, the IG 120 could be configured to change the smooth texture 154 to the rough texture 160 in response to the roll attitude of the aircraft reaching and/or exceeding the roll trigger attitude. It should be noted that the rough texture 160 may be configurable by the manufacturer and/or end-user and does not have to the replicate the actual visual appearance located in the actual scene located in front of the aircraft.

Figure 3B:
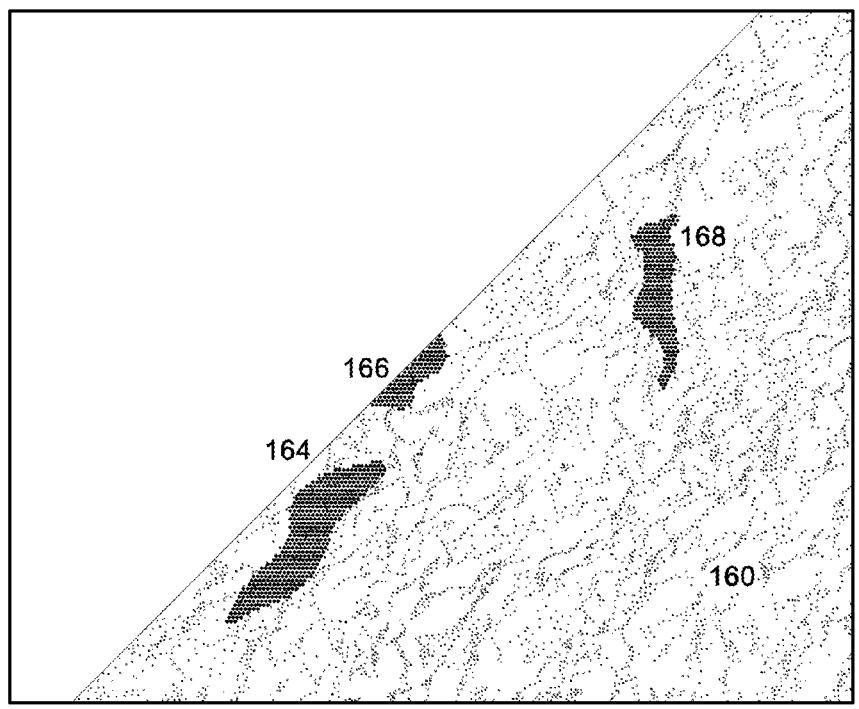
FIG. 3B depicts a movement of the rough texture of FIG. 3A.

When the roll attitude of the aircraft meets and/or exceeds a roll trigger attitude, the rough texture 160 could appear to visually move as illustrated by FIGS. 3A through 3D, inclusive. As indicated by FIG. 3A, the aircraft is turning to the right, and the roll attitude has met the roll trigger attitude, causing the rough texture 160 to be displayed. Although the following discussion will be drawn to a left turn, the inventive concepts disclosed herein apply to a right turn. Referring to FIG. 3B and as indicated by an absence of spot 162 and the new positions of spots 164, 166, and 168, the rough texture 160 has visually moved as the right turn continues. Here, the rough texture 160 moves parallel to the horizon line 156 (shown in FIG. 2A) and in a direction opposite of the right turn; as seen by the pilot, the rough texture 160 moves diagonally downward and in the direction opposite of the right turn, enhancing the pilot's situational awareness of an unusual roll attitude or steep right turn.

Figure 3C:
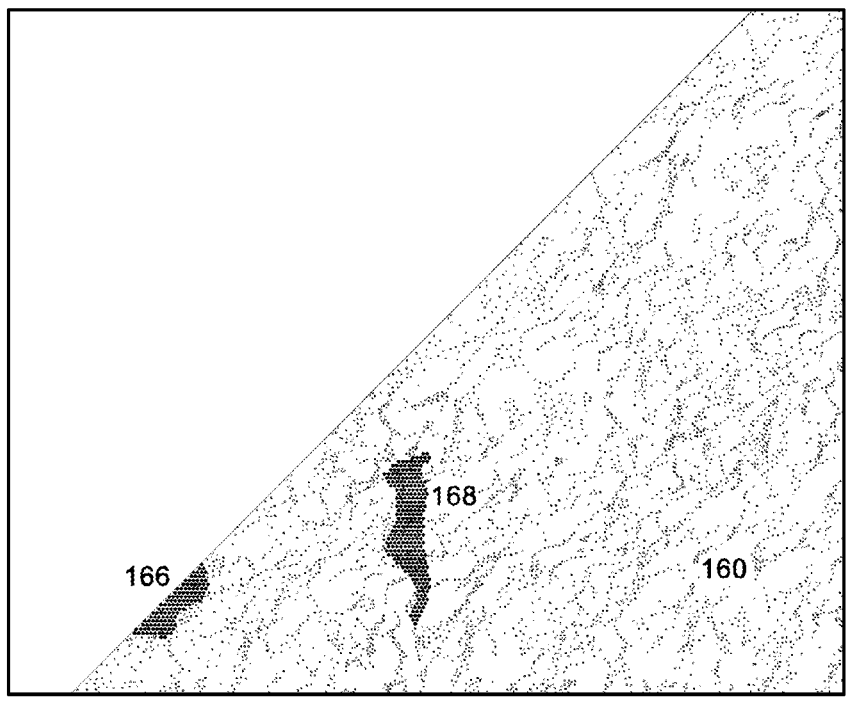
FIG. 3C depicts continuous movement of the rough texture of FIG. 3B.
Figure 3D:
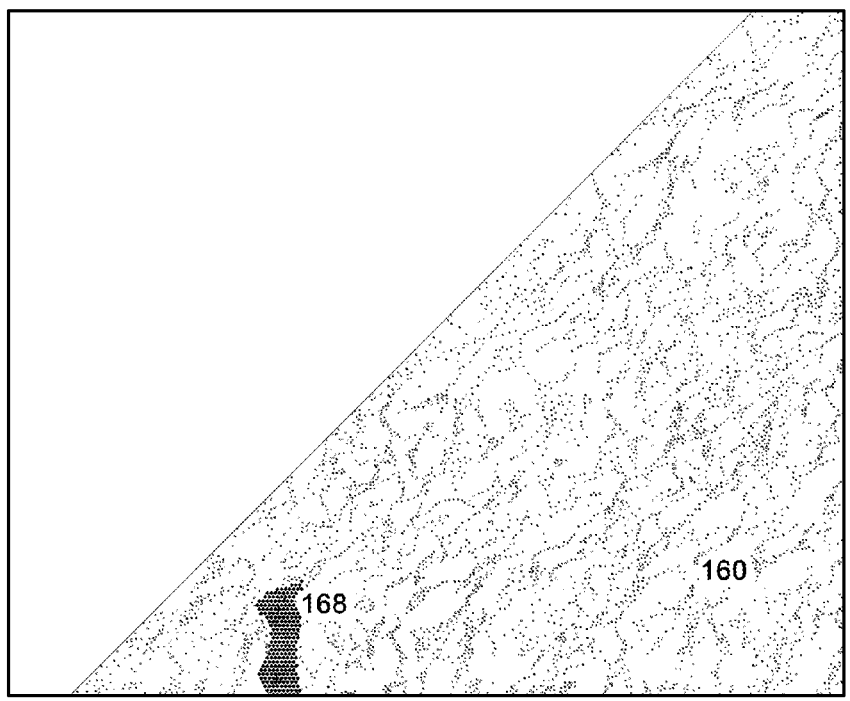
FIG. 3D depicts continuous movement of the rough texture of FIG. 3C.

Referring to FIG. 3C and as indicated by an absence of spots 162 and 164 and the new positions of spots 166 and 168, the rough texture 160 continues to visually move as the right turn continues. Referring to FIG. 3D and as indicated by an absence of spots 162, 164, and 166 and the new position of spot 168, the rough texture 160 continues to visually move as the right turn continues. This visual movement may continue until the roll attitude is decreased below the roll trigger attitude, continuing to enhance the pilot's situational awareness; moreover, the optical flow of the texture pattern enhances the ability of the pilot to perceive movement in the display when it is viewed in the periphery vison of the pilot's current field of view.

Similar to the roll attitude, when the pitch attitude of the aircraft meets and/or exceeds a pitch trigger attitude, rough texture could appear to visually move as illustrated by FIGS. 4A through 4D, inclusive. Although the following discussion will be drawn to a descending pitch attitude, the inventive concepts disclosed herein apply to a climbing pitch attitude.

Figure 4A:
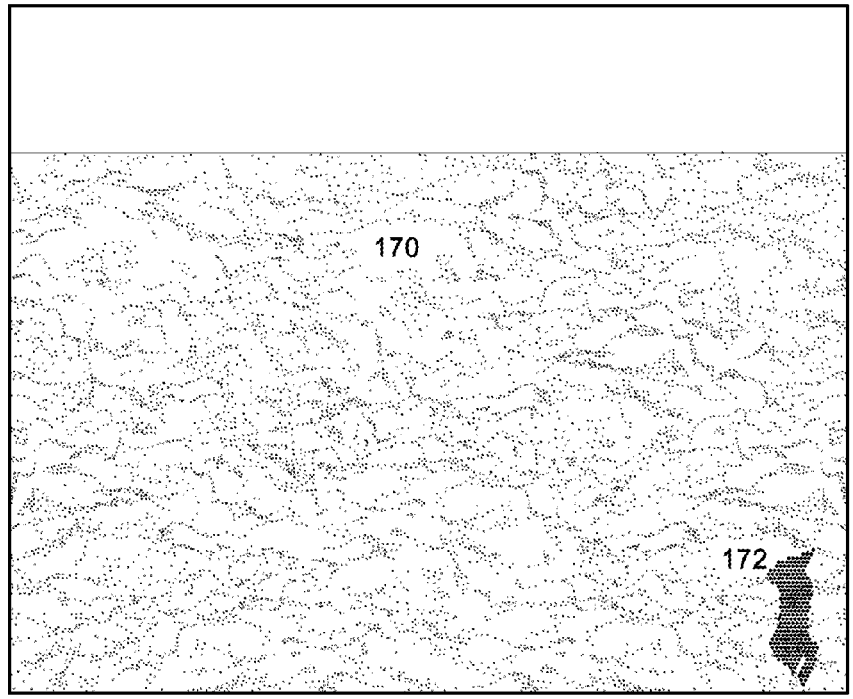
FIG. 4A depicts an exemplary illustration of a classic electronic attitude indicator in which rough texture replaces a smooth texture during a descent.
Figure 4B:
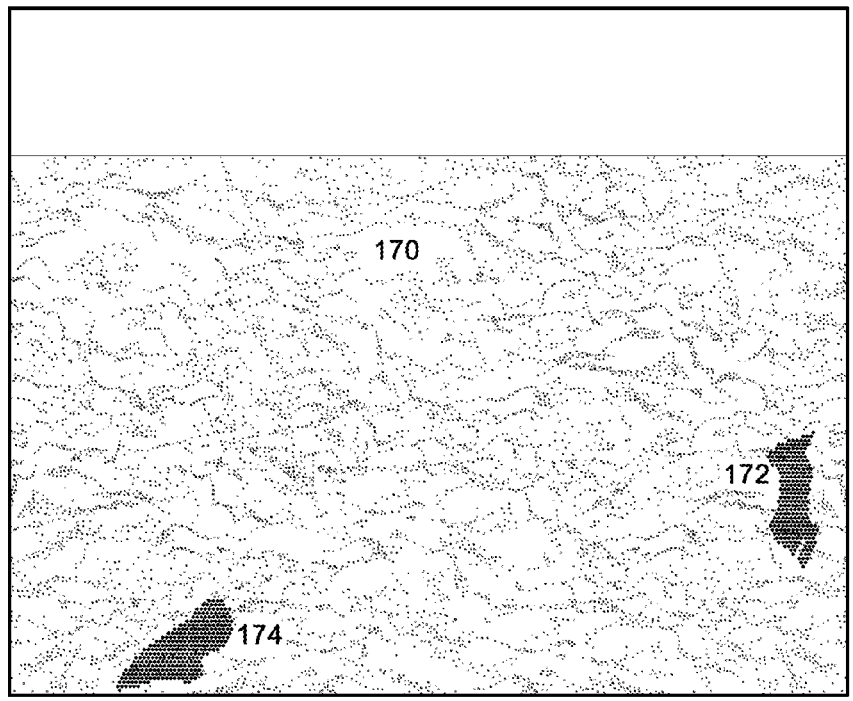
FIG. 4B depicts a movement of the rough texture of FIG. 4A.

Referring to FIG. 4A, the visually-appearing smooth texture of the brown ground 154 of the attitude indicators shown in FIGS. 2A and 2B has been replaced by a visually-appearing rough texture 170 to which spot 172 has been added to illustrate the movement of the rough texture 170 during a change in pitch angle. As indicated by FIG. 4A, the aircraft is descending, and the pitch attitude has met and/or exceeded the pitch trigger attitude (which for the sake of illustration only, is set to a hypothetical approximate value of ten degrees), causing the rough texture 170 to be displayed. Referring to FIG. 4B and as indicated by new position of spot 172 and the presence of a new spot 174, the rough texture 170 has visually moved as the negative pitch angle continues to increase (although the horizon line will remain in the same position for the sake of illustration. Here, the rough texture 170 moves perpendicular to the horizon line 156 (shown in FIG. 2A) and in a direction opposite of the descent; as seen by the pilot, the rough texture 170 moves upward which is in the direction opposite of the pitch change, enhancing the pilot's situational awareness of an unusual pitch attitude or steep descent.

Figure 4C:
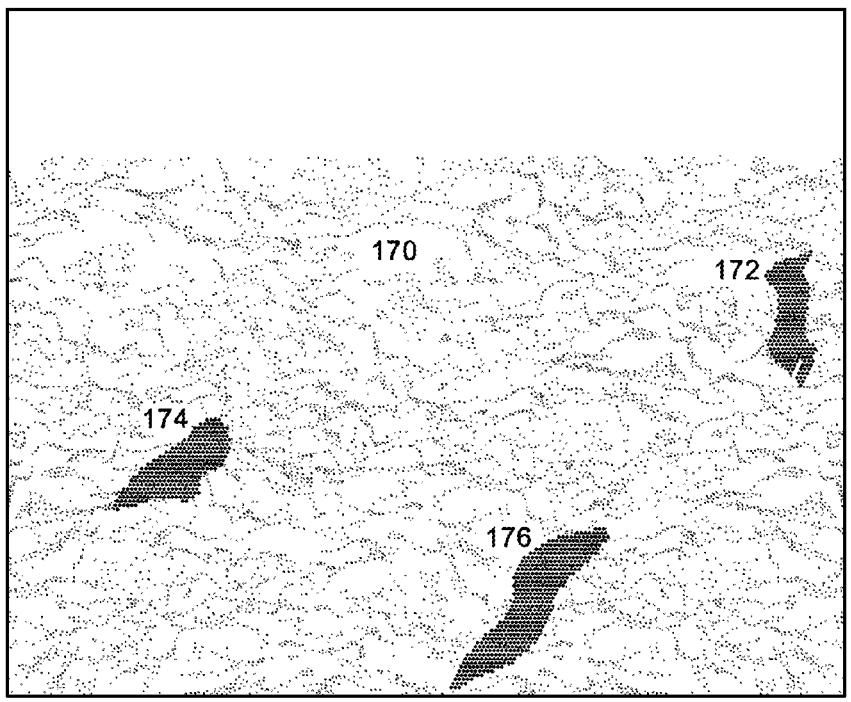
FIG. 4C depicts continuous movement of the rough texture of FIG. 4B.
Figure 4D:
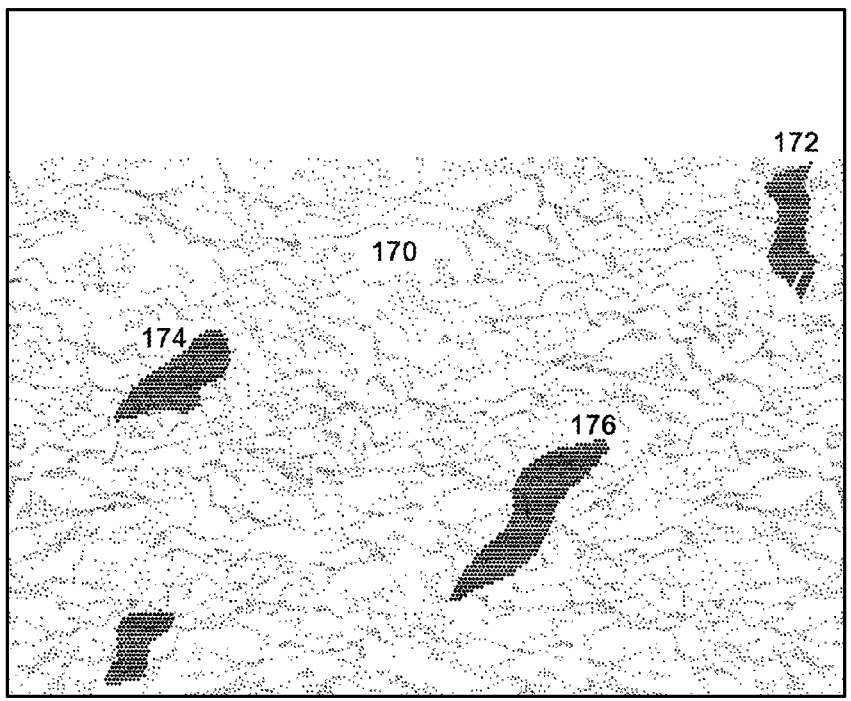
FIG. 4D depicts continuous movement of the rough texture of FIG. 4C.

Referring to FIG. 4C and as indicated by new positions of spots 172 and 174 and the presence of a new spot 176, the rough texture 170 continues to visually move as the negative pitch angle continues to increase, the rough texture continues to visually move as the descent continues. Referring to FIG. 4D and as indicated by new positions of spots 172, 174, and 176 and the presence of a new spot 178, the rough texture 170 continues to visually move as the negative pitch angle and descent continues. This visual movement may continue until the pitch attitude is decreased below the pitch trigger attitude.

Although the preceding discussion has been drawn to separate visual movements of roll and pitch attitudes, the inventive concepts disclosed herein include the visual movement of rough texture resulting from a scenario when both roll and pitch attitudes exceed the roll trigger and pitch trigger attitudes, respectively. In such cases, the visual movement of the rough texture may be neither parallel nor perpendicular to the horizon line (shown in FIG. 2A) but commensurate with a combination of roll and pitch attitudes. Furthermore, a manufacturer and/or end-user may configure the rate of a visual movement of rough texture commensurate with and/or proportional to the amount of roll or pitch attitude that exceeds the roll trigger and pitch trigger attitudes, respectively.

Figure 5:
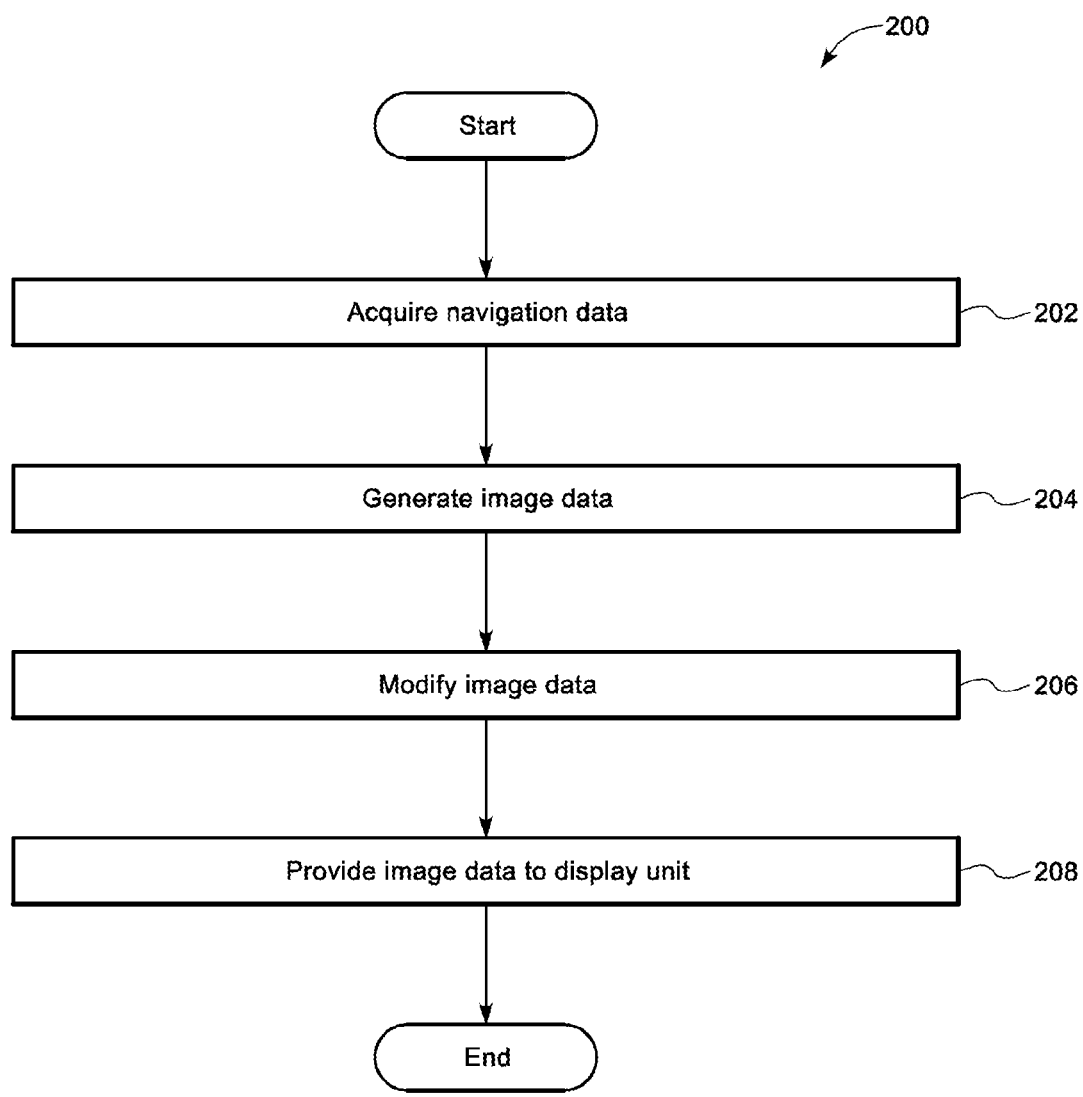
FIG. 5 illustrates a flowchart disclosing an embodiment of a method for generating and presenting an aircraft attitude indicator.

FIG. 5 depicts flowchart 200 providing an example for generating and/or presenting an image of an aircraft attitude indicator, where the IG 120 may be programmed or configured with instructions corresponding to the following modules that that may be continuously or periodically executed throughout the aircraft operation. The IG 120 may be a processing unit(s) of a module such as, but not limited to, a printed circuit card assembly having one or more input interfaces (e.g., virtual or physical computer ports) to facilitate data communications with the IG 120, i.e., the receiving and providing of data (e.g., one or more electrical or optical signals including data and/or being indicative of data). For the accomplishment of the following modules embodied in FIG. 5, the acquiring of data is synonymous and/or interchangeable with reading, receiving, and/or the retrieval of data.

The method of flowchart 200 begins with module 202 with the IG 120 acquiring navigation data representative of aircraft attitude from the navigation data source 110. In some embodiments, the aircraft attitude could include the roll attitude and/or the pitch attitude of the aircraft.

The method of flowchart 200 continues with module 204 with the IG 120 generating image data representative of an image of an aircraft attitude indicator. The aircraft attitude indicator includes a sky area and a ground area, where the traditional colors of the sky area and ground area are blue and brown, respectively. In some embodiments, the texture of the sky area and/or the ground area may visually appear as smooth (or having a smooth textured appearance) when the aircraft attitude is less than or equal to a trigger attitude; that is, both may be absent of a rough texture. Having a smooth appearance, the ground area may not replicate the actual visual appearance located in the actual scene located in front of the aircraft that is seen by the pilot.

The method of flowchart 200 continues with module 206 with the IG 120 modifying the image data if the aircraft attitude is greater than or is equal to the trigger attitude. In some embodiments, the visual appearance of the ground area may change from having a smooth textured appearance to a textured appearance. In some embodiments, the second texture may visually move as the image data is being modified. In some embodiments, the visual appearance of the ground area may change intermittently between a smooth textured appearance and a textured appearance as the image data is being modified.

The method of flowchart 200 continues with module 208 with the IG 120 providing the image data to the presentation system 130 comprised of one or more display units. Each display unit may be configured to receive the image data and present the image data to one or more viewers, whereby the presentation of the textured appearance informs the viewer of an unusual attitude. In some embodiments, the unusual attitude could include an unusual roll attitude and/or an unusual pitch attitude.

Optionally, a processor such as the IG 120 may be configured to generate advisory data representative of an aural advisory and/or a tactile advisory when the image data is modified, where the advisory data may be then provided to the presentation system 130, where the aural advisory unit 134 and/or the tactile advisory unit 136 may present the aural advisories and/or tactile advisories, respectively. Then, the method of flowchart 200 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Furthermore, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for presenting an aircraft attitude indicator, comprising:
   at least one display unit configured to:
      receive image data representative of an image of an aircraft attitude indicator provided by
      an image generator including at least one processor coupled to a non-transitory processor-readable medium storing processor-executable code and configured to:
         acquire navigation data representative of a roll attitude and a pitch attitude from a source of navigation data; and
         generate the image data as a function of the roll attitude and the pitch attitude, where
            the aircraft attitude indicator is comprised of at least a sky area and a ground area presenting one of a plurality of visual presentations, where
               a first visual presentation of the ground area includes a presentation that does not change when
                  the roll attitude is less than or equal to a roll trigger attitude defining an unusual roll attitude, and
                  the pitch attitude is less than or equal to a pitch trigger attitude defining an unusual pitch attitude, and
               a second visual presentation of the ground area includes a rough-textured presentation that moves within the ground area when the roll attitude or the pitch attitude is greater than or equal to the roll trigger attitude or the pitch trigger attitude, respectively; and
      present the image represented in the image data, whereby
         an optical flow of the rough-textured presentation, without a change to a presentation of the sky area, is provided when the unusual roll attitude or the unusual pitch attitude is being encountered.

2. The system of claim 1, wherein
   a color of the sky area is blue, and
   a color of the ground area of the first visual presentation is brown.

3. The system of claim 1, wherein the ground area of the first presentation includes a smooth appearance or a smooth-textured appearance.

4. The system of claim 1, wherein the rough-textured presentation includes at least one of an irregularly-shaped spot and an irregularly-sized spot.

5. The system of claim 1, wherein
   a third visual presentation of the ground area includes a smooth-textured appearance that moves within the ground area when the roll attitude or the pitch attitude is greater than or equal to the roll trigger attitude or the pitch trigger attitude, respectively, such that
      the second visual presentation and the third visual presentation are presented intermittently.

6. The system of claim 1, wherein neither the first visual presentation nor the second visual presentation replicate a ground surface located in an actual scene in front of the aircraft.

7. The system of claim 1, wherein
   the image generator is further configured to:
      generate advisory data representative of at least one of an aural advisory and a tactile advisory when the roll attitude or the pitch attitude is greater than or equal to the roll trigger attitude or the pitch trigger attitude, respectively; and
      provide the advisory data to at least one of an aural advisory unit and a tactile advisory unit, whereby the aural advisory and the tactile advisory, respectively, is provided when the unusual roll attitude or the unusual pitch attitude is being encountered.

8. A device for generating an aircraft attitude indicator, comprising:
   an image generator including at least one processor coupled to a non-transitory processor-readable medium storing processor-executable code and configured to:

acquire navigation data representative of a roll attitude and a pitch attitude from a source of navigation data; and generate the image data as a function of the roll attitude and the pitch attitude, where the image data is representative of an image of at least an aircraft attitude indicator comprised of at least a sky area and a ground area presenting one of a plurality of visual presentations, where a first visual presentation of the ground area includes a presentation that does not change when the roll attitude is less than or equal to a roll trigger attitude defining an unusual roll attitude, and the pitch attitude is less than or equal to a pitch trigger attitude defining an unusual pitch attitude, and a second visual presentation of the ground area includes a rough-textured presentation that moves within the ground area when the roll attitude or the pitch attitude is greater than or equal to the roll trigger attitude or the pitch trigger attitude, respectively, such that the image is presentable by at least one display unit to provide an optical flow of the rough-textured presentation, without a change to a presentation of the sky area, when the unusual roll attitude or the unusual pitch attitude is being encountered.

9. The device of claim 8, wherein
a color of the sky area is blue, and
a color of the ground area of the first visual presentation is brown.

10. The device of claim 8, wherein the ground area of the first presentation includes a smooth appearance or a smooth-textured appearance.

11. The device of claim 8, wherein the rough-textured presentation includes at least one of an irregularly-shaped spot and an irregularly-sized spot.

12. The device of claim 8, wherein
a third visual presentation of the ground area includes a smooth-textured appearance that moves within the ground area when the roll attitude or the pitch attitude is greater than or equal to the roll trigger attitude or the pitch trigger attitude, respectively, such that
the second visual presentation and the third visual presentation are presented intermittently.

13. The device of claim 8, wherein neither the first visual presentation nor the second visual presentation replicate a ground surface located in an actual scene in front of the aircraft.

14. The device of claim 8, wherein
the image generator is further configured to:
generate advisory data representative of at least one of an aural advisory and a tactile advisory when the roll attitude or the pitch attitude is greater than or equal to the roll trigger attitude or the pitch trigger attitude, respectively; and
provide the advisory data to at least one of an aural advisory unit and a tactile advisory unit to provide the aural advisory and the tactile advisory, respectively, when the unusual roll attitude or the unusual pitch attitude is being encountered.

15. A method for generating an aircraft attitude indicator, comprising:
acquiring, by at least one processor executing processor-executable code, navigation data representative of a roll attitude and a pitch attitude from a source of navigation data; and
generating image data as a function of the roll attitude and the pitch attitude, where
the image data is representative of an image of at least an aircraft attitude indicator comprised of at least a sky area and a ground area presenting one of a plurality of visual presentations, where
a first visual presentation of the ground area includes a presentation that does not change when
the roll attitude is less than or equal to a roll trigger attitude defining an unusual roll attitude, and
the pitch attitude is less than or equal to a pitch trigger attitude defining an unusual pitch attitude, and
a second visual presentation of the ground area includes a rough-textured presentation that moves within the ground area when the roll attitude or the pitch attitude is greater than or equal to the roll trigger attitude or the pitch trigger attitude, respectively, such that
the image is presentable by at least one display unit to provide an optical flow of the rough-textured presentation, without a change to a presentation of the sky area, when the unusual roll attitude or the unusual pitch attitude is being encountered.

16. The method of claim 15, the ground area of the first presentation includes a smooth appearance or a smooth-textured appearance.

17. The method of claim 15, wherein the rough-textured presentation includes at least one of an irregularly-shaped spot and an irregularly-sized spot.

18. The method of claim 15, wherein
a third visual presentation of the ground area includes a smooth-textured appearance that moves within the ground area when the roll attitude or the pitch attitude is greater than or equal to the roll trigger attitude or the pitch trigger attitude, respectively, such that
the second visual presentation and the third visual presentation are presented intermittently.

19. The method of claim 15, wherein neither the first visual presentation nor the second visual presentation replicate a ground surface located in an actual scene in front of the aircraft.

20. The method of claim 15, further comprising:
generating advisory data representative of at least one of an aural advisory and a tactile advisory when the roll attitude or the pitch attitude is greater than or equal to the roll trigger attitude or the pitch trigger attitude, respectively; and
providing the advisory data to at least one of an aural advisory unit and a tactile advisory unit to provide the aural advisory and the tactile advisory, respectively, when the unusual roll attitude or the unusual pitch attitude is being encountered.

* * * * *